United States Patent
Longmore et al.

(10) Patent No.: US 11,652,724 B1
(45) Date of Patent: May 16, 2023

(54) SERVICE PROXIES FOR AUTOMATING DATA CENTER BUILDS

(71) Applicant: Amazon Technologies, Inc., Seattle, WA (US)

(72) Inventors: Juan-Pierre Longmore, Seattle, WA (US); Andrew J Lusk, Seattle, WA (US); Eric Wei, Seattle, WA (US); Anuj Prateek, Edmonds, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 34 days.

(21) Appl. No.: 16/601,031

(22) Filed: Oct. 14, 2019

(51) Int. Cl.
| | |
|---|---|
| G06F 11/36 | (2006.01) |
| G06F 9/54 | (2006.01) |
| G06F 9/44 | (2018.01) |
| G06F 15/16 | (2006.01) |
| H04L 29/08 | (2006.01) |
| H04L 43/50 | (2022.01) |
| G06F 9/455 | (2018.01) |
| H04L 67/563 | (2022.01) |
| H04L 67/566 | (2022.01) |

(52) U.S. Cl.
CPC .......... *H04L 43/50* (2013.01); *G06F 9/45558* (2013.01); *H04L 67/563* (2022.05); *H04L 67/566* (2022.05); *G06F 2009/45595* (2013.01)

(58) Field of Classification Search
CPC . H04L 43/50; H04L 67/2833; H04L 67/2814; H04L 9/45558; G06F 9/45558; G06F 2009/45595

USPC ........................................................ 709/224
See application file for complete search history.

(56) References Cited

U.S. PATENT DOCUMENTS

| | | | | |
|---|---|---|---|---|
| 7,496,658 | B2 * | 2/2009 | Southam | H04L 67/563 709/224 |
| 8,108,711 | B2 * | 1/2012 | Meijer | H04L 43/50 714/38.14 |
| 8,762,486 | B1 * | 6/2014 | Butaud | H04L 43/55 709/217 |
| 9,148,293 | B2 * | 9/2015 | McFate | G06F 9/5088 |
| 9,197,517 | B2 * | 11/2015 | Ravichandran | G06Q 30/0243 |
| 9,459,856 | B2 * | 10/2016 | Curzi | G06F 8/65 |
| 9,588,790 | B1 * | 3/2017 | Wagner | G06F 9/4881 |
| 9,594,670 | B2 * | 3/2017 | Gyure | G06F 11/3664 |
| 9,658,848 | B2 * | 5/2017 | Bragg, Jr. | G06F 8/71 |
| 10,374,866 | B1 * | 8/2019 | Berg | H04L 67/148 |
| 10,761,875 | B1 * | 9/2020 | Burgin | G06F 9/505 |
| 10,771,372 | B2 * | 9/2020 | Hill | H04L 43/062 |
| 2005/0010661 | A1 * | 1/2005 | Southam | H04L 67/563 709/224 |

(Continued)

*Primary Examiner* — Kevin T Bates
*Assistant Examiner* — Golam Mahmud
(74) *Attorney, Agent, or Firm* — Thomas | Horstemeyer, LLP

(57) ABSTRACT

Disclosed are various embodiments for automating data center builds through the use of service proxies. A proxy is configured in a testing computing environment to receive service calls for a plurality of first services in the testing computing environment. The proxy forwards the service calls to at least one corresponding instance of the plurality of first services not in the testing computing environment. One or more second services in the testing computing environment that generate the service calls for the plurality of first services are then tested. The service calls are handled by the proxy during testing.

20 Claims, 6 Drawing Sheets

(56) References Cited

U.S. PATENT DOCUMENTS

| | | | | |
|---|---|---|---|---|
| 2008/0049623 A1* | 2/2008 | Qiu | H04M 7/0084 | 370/241 |
| 2009/0113250 A1* | 4/2009 | Meijer | H04L 43/50 | 714/43 |
| 2009/0207752 A1* | 8/2009 | Bugenhagen | H04L 47/801 | 370/252 |
| 2011/0276963 A1* | 11/2011 | Wu | G06F 3/067 | 718/1 |
| 2012/0076015 A1* | 3/2012 | Pfeffer | H04L 43/50 | 370/252 |
| 2012/0131567 A1* | 5/2012 | Barros | G06F 9/5088 | 717/170 |
| 2014/0189677 A1* | 7/2014 | Curzi | G06F 8/65 | 717/171 |
| 2014/0189714 A1* | 7/2014 | Lawbaugh | G06F 11/3644 | 719/313 |
| 2015/0081906 A1* | 3/2015 | Backholm | H04L 67/60 | 709/225 |
| 2016/0028598 A1* | 1/2016 | Khakpour | H04L 43/50 | 709/224 |
| 2016/0092339 A1* | 3/2016 | Straub | G06F 9/44521 | 717/124 |
| 2016/0170792 A1* | 6/2016 | Kato | G06F 9/5077 | 718/1 |
| 2016/0170793 A1* | 6/2016 | Decusatis | G06F 9/45558 | 718/1 |
| 2017/0242784 A1* | 8/2017 | Heorhiadi | G06F 11/3684 | |
| 2018/0004575 A1* | 1/2018 | Marriner | G06F 9/45558 | |
| 2018/0234329 A1* | 8/2018 | Wurth | G06F 11/3672 | |
| 2018/0321993 A1* | 11/2018 | McClory | H04L 41/5041 | |
| 2018/0338187 A1* | 11/2018 | Ketonen | H04W 24/04 | |
| 2018/0368010 A1* | 12/2018 | Mitchell | H04L 41/0645 | |
| 2018/0373885 A1* | 12/2018 | Arad | G06F 21/6254 | |
| 2019/0028538 A1* | 1/2019 | Chen | H04L 67/1034 | |
| 2019/0097893 A1* | 3/2019 | Angoulvant | H04L 41/145 | |
| 2019/0116110 A1* | 4/2019 | Raney | G06F 8/60 | |
| 2019/0289481 A1* | 9/2019 | Qvarfordt | H04B 7/0626 | |
| 2020/0327015 A1* | 10/2020 | Vargas | G06F 11/1471 | |

\* cited by examiner

SERVICE PROXIES FOR AUTOMATING DATA CENTER BUILDS

BACKGROUND

Utility computing providers, enterprises, and other organizations may maintain computing infrastructure in different geographic regions. Although Internet connectivity may be worldwide, there are advantages to having network services deployed in different regions, including reduced operating costs, lower latencies, increased bandwidth, redundancy, regulatory advantages, and so on. As demand increases in a region, an organization may decide to add a data center in that region.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
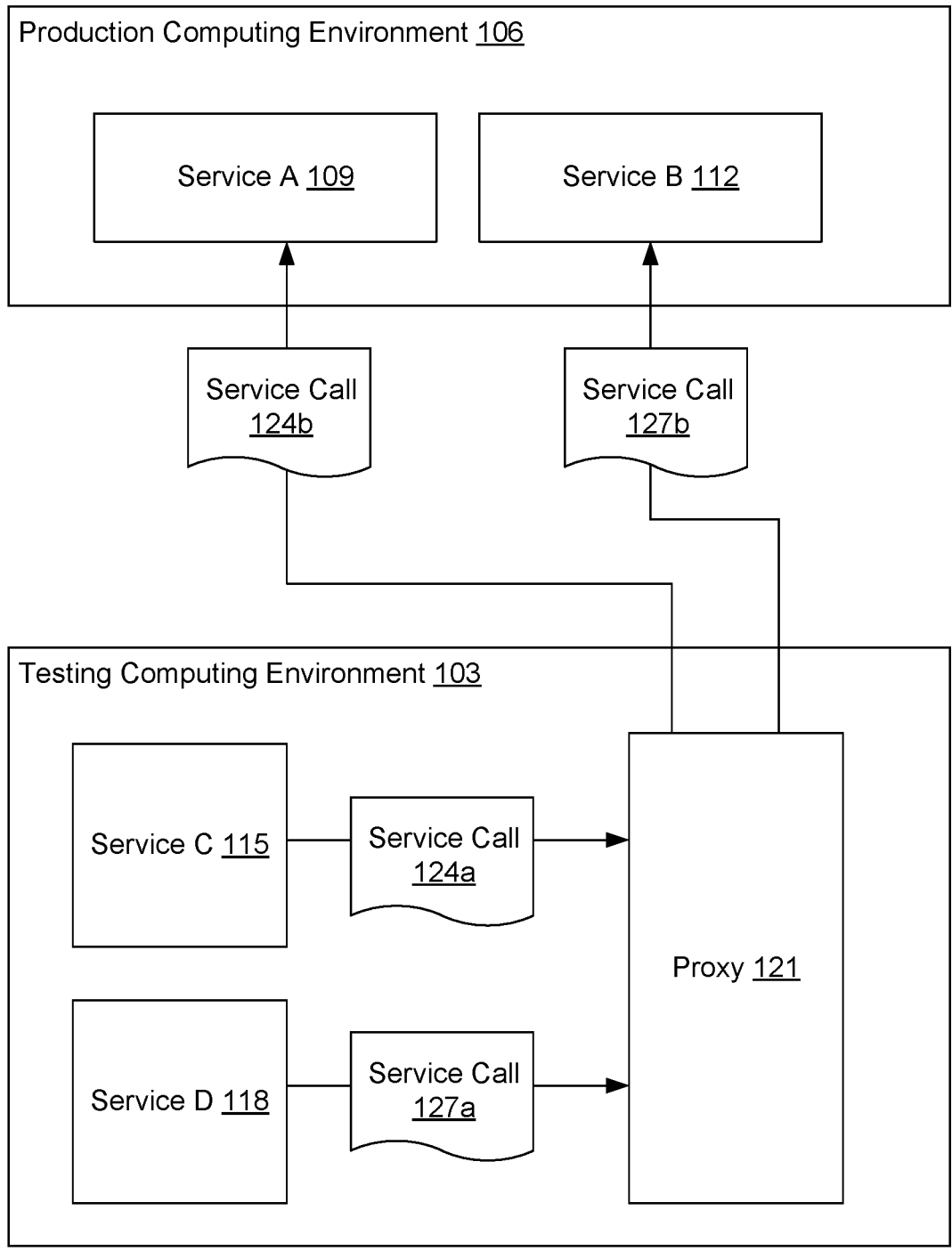
FIG. 1 is a drawing of an example scenario involving a networked environment according to various embodiments of the present disclosure.

The present application relates to the use of service proxies in order to automate data center builds, for example data center builds for new regions in a cloud provider network. An cloud provider may determine that its computing services are in sufficient demand in a geographic region that an additional data center in that geographic region is warranted. Although the costs of building a new data center may be significant, savings may be realized in terms of wide area network utilization. Further, there may be substantial performance improvements for the users in the geographic region of the data center.

An organization may decide to offer the same computing services in multiple geographic regions. However, with an organization having many service offerings, building a new data center may not be a simple matter of copying the operating configuration of an existing data center. Instead, numerous teams may need to work independently to deploy instances of their respective services in the new data center. This may be done in a virtualized testing environment in an existing data center prior to the physical hardware in the target data center coming online. Some services may be more complex and take more time to configure than others, and other services may depend on these services in order to be configured. Consequently, a bottleneck may develop while waiting on these services to be configured, potentially delaying the entire project. In some cases, services may have circular dependencies (e.g., service A depends on service B, service B depends on service C, and service C depends on service A), which can require close cooperation between service owners and delays to resolve.

Various embodiments of the present disclosure introduce the use of service proxies in a testing environment to stand in the place of services that require a lengthy and complex configuration so that other dependent services may be configured at an earlier time. A service proxy may receive application programming interface (API) calls from the dependent services and forward those API calls to an existing instance of the service in a production environment. The service proxy may receive the response from the existing instance of the service and then forward the response to the respective dependent service.

In this way, the dependent services may be fully configured and tested in the testing environment before the proxied service is truly online in the testing environment. This has the advantage of avoiding temporary manual configuration by the service developer to call services in a production environment directly, which can result in extra time in coding and then reversing the changes. Since such changes are temporary, errors and unintended consequences can result based on human error in failing to reverse the changes or otherwise update the code or configuration. Additionally, the use of service proxies can have the effect of resolving any circular dependencies. Once the proxied service is online, the data associated with the proxy in the existing instance of the service can be migrated, and the service proxy can be replaced.

Turning now to FIG. 1, shown is a drawing of a networked environment 100 illustrating an example scenario in accordance with various embodiments. The networked environment 100 includes a testing computing environment 103 and a production computing environment 106. The production computing environment 106 executes a service A 109, a service B 112, and other services. The testing computing environment 103 executes a service C 115, a service D 118, a proxy 121, and other services.

Although service A and service B will eventually be deployed in the testing computing environment 103, service A and service B have not yet been deployed in the testing computing environment 103. However, the operation of service C 115 and service D 118 in the testing computing environment 103 depend on the availability of service A and service B in the testing computing environment 103. For example, the operation of service C 115 and service D 118 may not be fully tested unless service A and service B are available in the testing computing environment 103.

To allow for testing and deployment of service C 115 and service D 118 in the testing computing environment 103 before service A and service B are deployed, the proxy 121 masquerades as service A and service B in the testing computing environment 103. In masquerading as services A and B, services A and B appear to be within the testing computing environment 103 to service C 115 and service D 118. Accordingly, the proxy 121 receives a service call 124a from service C 115 that is intended for service A, and the proxy 121 receives a service call 127a from service D 118 that is intended for service B.

The proxy 121 provides the functionality of service A and service B by forwarding the service calls 124 and 127 to corresponding instances of services A and B in a production computing environment 106, namely, service A 109 and service B 112. In forwarding the service calls, the proxy 121 may perform a transformation on the service calls, thereby generating service calls 124b and 127b, which are sent to service A 109 and service B 112, respectively. The proxy 121 may receive responses from service A 109 and service B 112, may transform the responses, and then return the responses to service C 115 and service D 118, respectively. In this way, service C 115 and service D 118 are able to access the functionality of services A and B without those services being deployed in the testing computing environment 103. In the following discussion, a general description of the system and its components is provided, followed by a discussion of the operation of the same.

Figure 2:
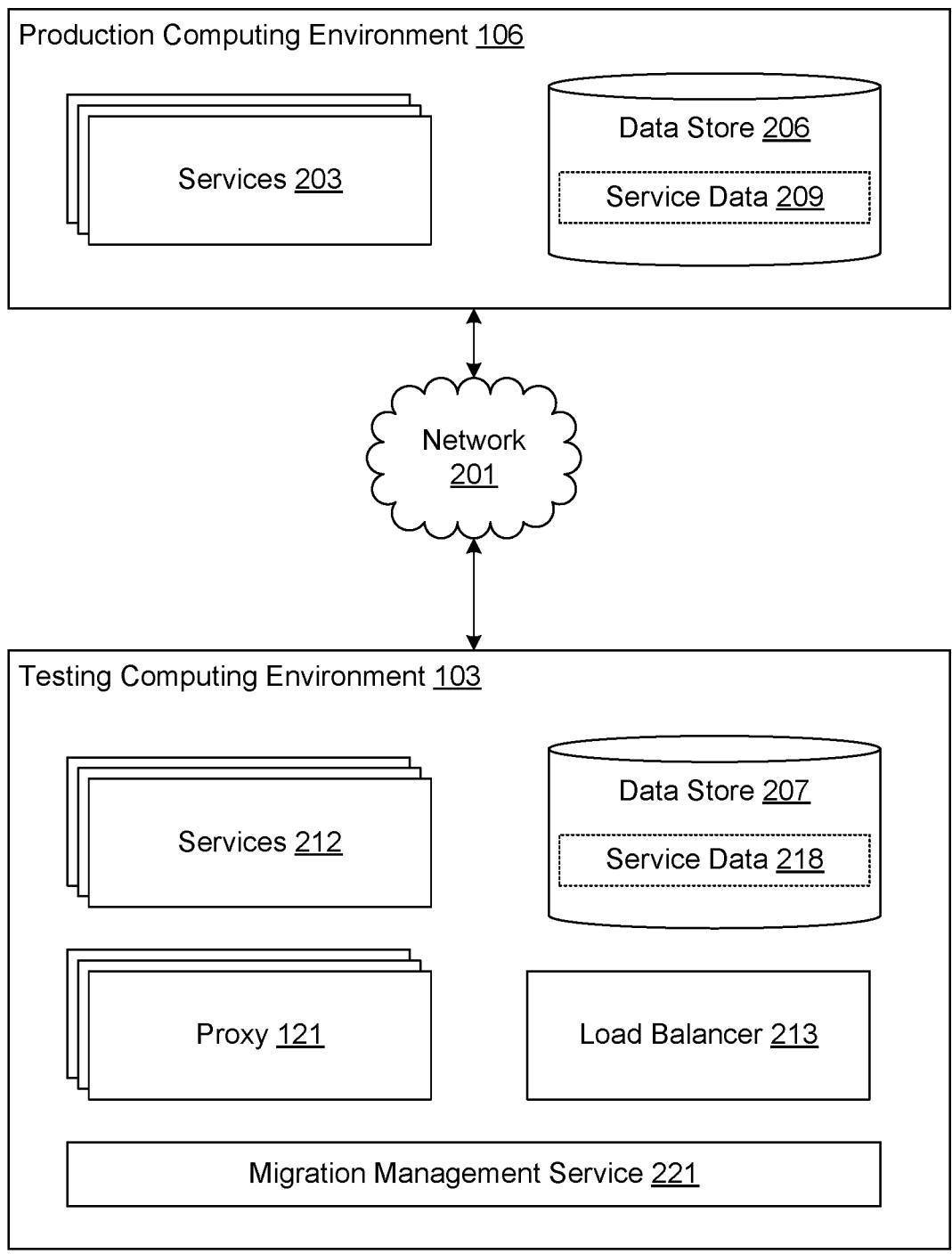
FIG. 2 is a schematic block diagram of a networked environment according to various embodiments of the present disclosure.

With reference to FIG. 2, shown is the networked environment 100 according to various embodiments. The networked environment 100 includes a testing computing environment 103 and the production computing environment 106, which are in data communication with each other via a network 201. The network 201 includes, for example, the Internet, intranets, extranets, wide area networks (WANs), local area networks (LANs), wired networks, wireless networks, cable networks, satellite networks, or other suitable networks, etc., or any combination of two or more such networks.

The networked environment 100 may correspond to a cloud provider network (sometimes referred to simply as a "cloud"), which is a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Example regions include U.S. East (located on the east coast of the U.S.), U.S. West (located on the west coast of the U.S.), Europe—London, and Europe—Paris. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) to access resources and services of the cloud provider network. Beneficially, the disclosed techniques can be used to automate at least a portion of the process of bringing a new cloud provider region online.

The testing computing environment 103 and the production computing environment 106 may comprise, for example, a server computer or any other system providing computing capability. Alternatively, the testing computing environment 103 and the production computing environment 106 may employ a plurality of computing devices that may be arranged, for example, in one or more server banks or computer banks or other arrangements. Such computing devices may be located in a single installation or may be distributed among many different geographical locations. For example, the testing computing environment 103 and the production computing environment 106 may include a plurality of computing devices that together may comprise a hosted computing resource, a grid computing resource, and/or any other distributed computing arrangement. In some cases, the testing computing environment 103 and the production computing environment 106 may correspond to an elastic computing resource where the allotted capacity of processing, network, storage, or other computing-related resources may vary over time.

In some embodiments, the testing computing environment 103 and/or the production computing environment 106 may correspond to a virtualized private network within a physical network comprising virtual machine instances executed on physical computing hardware, e.g., by way of a hypervisor. The virtual machine instances may be given network connectivity by way of virtualized network components enabled by physical network components, such as routers and switches.

Various services, applications, and/or other functionality may be executed in the testing computing environment 103 and the production computing environment 106 according to various embodiments. Also, various data is stored in a data store 206 that is accessible to the production computing environment 106 and in a data store 207 that is accessible to the testing computing environment 103. Each of the data stores 206 and 207 may be representative of a plurality of data stores as can be appreciated. The data stored in the data stores 206 and 207, for example, is associated with the operation of the various applications and/or functional entities described below.

The components executed in the production computing environment 106, for example, include a suite of services 203 and other applications, services, processes, systems, engines, or functionality not discussed in detail herein. The suite of services 203 may be configured to enable a wide variety of functionality. In various embodiments, individual services 203 may provide an eventually consistent data storage service where data is stored in respective buckets, a database service that supports key-value and document data structures, a distributed message queuing service, a workflow management service, and/or other services. The services 203 may be made available to customers under a utility computing model, whereby usage of the services 203 are metered, and customers are billed for their usage. The services 203 may store service data 209 in the data store 206. A plurality of instances of respective services 203 may be executed in the production computing environment 106 to meet demand, and the number of instances may be automatically scaled up and down based on demand, cost, and/or other factors. In some cases, the instances of the services 203 may be behind load balancers in order to distribute the service request load equitably among the instances.

The components executed in the testing computing environment 103, for example, include a suite of services 212, a proxy 121, a load balancer 213, and other applications, services, processes, systems, engines, or functionality not discussed in detail herein. The suite of services 212 may correspond to a subset of the suite of services 203 in the production computing environment 106, and over time, additional services 212 may be deployed in the testing computing environment 103 so that the suite of services 212 may fully replicate the suite of services 203 or replicate at least the services 203 that are deemed appropriate for the testing computing environment 103. Although various services 212 may replicate services 203, the configurations and/or their implementations may differ to some extent.

Further, various services 212 that are intended to be deployed in the testing computing environment 103 may not yet be deployed and/or online within the testing computing environment 103 in order to respond to service calls. Various services 212 may depend on other services 212 to perform their functionality. For example, a service 212 that performs speech recognition may depend on another service 212 that is a data storage service and yet another service that is a database service. The services 212 may store service data 218 in the data store 207.

The services 212 that are intended to be deployed in the testing computing environment 103 but are not yet online may be proxied by the proxy 121. The proxy 121 is executed to receive service calls for the non-yet-online services 212 from other services 212 and to route the service calls over the network 201 to corresponding services 203 in the production computing environment 106. The proxy 121 receives responses to the service calls from the services 203 and then returns those responses to the calling services 212. In various examples, the proxy 121 may masquerade as the non-yet-online services 212. For example, the proxy 121 may have the same hostname, domain name, network address, unique identifier, and so forth, as the service 212 will have when it comes online.

Multiple instances of the proxy 121 may be executed in the testing computing environment 103, and one or more load balancers 213 may be configured to distribute or redirect service calls to the appropriate proxy 121. A proxy 121 may be specific to a particular service 212 or may be used for masquerading for multiple types of services 212. In one embodiment, the proxy 121 may include code stubs for all or a portion of an application programming interface (API) of a particular service 212. In another embodiment, the proxy 121 may include a generic interface that supports multiple APIs that use a common protocol, e.g., hypertext transfer protocol (HTTP), simple object access protocol (SOAP), representational state transfer (REST), and so forth. Through the use of a generic interface, the exact API need not be defined for the proxy 121 ahead of time, and the generic interface may interoperate with future API modifications. It is noted that various implementations of the proxy 121 may be stateful, or maintain state data in a memory. The state data may be used in order to match responses with service calls, to split service calls into multiple service calls, to combine multiple responses into fewer responses, to reverse transforms, and/or other functions.

Also executed within the testing computing environment 103 or the production computing environment 106 may be a migration management service 221. The migration management service 221 may be a tool configured to facilitate the creation and configuration of the testing computing environment 103 and the migration of the testing computing environment 103 to another data center as will be described. Further, the migration management service 221 may be executed to configure the proxy 121 and to migrate from the proxy 121 to a corresponding service 212 when it comes online.

Although the migration management service 221 is depicted as a single service in the testing computing environment 103, it is understood that other implementations may include the migration management service 221, or portions thereof, being executed in a client device. Such a client device may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The migration management service 221, or portions thereof, may be implemented as a client application executable in the client device.

Figure 3:
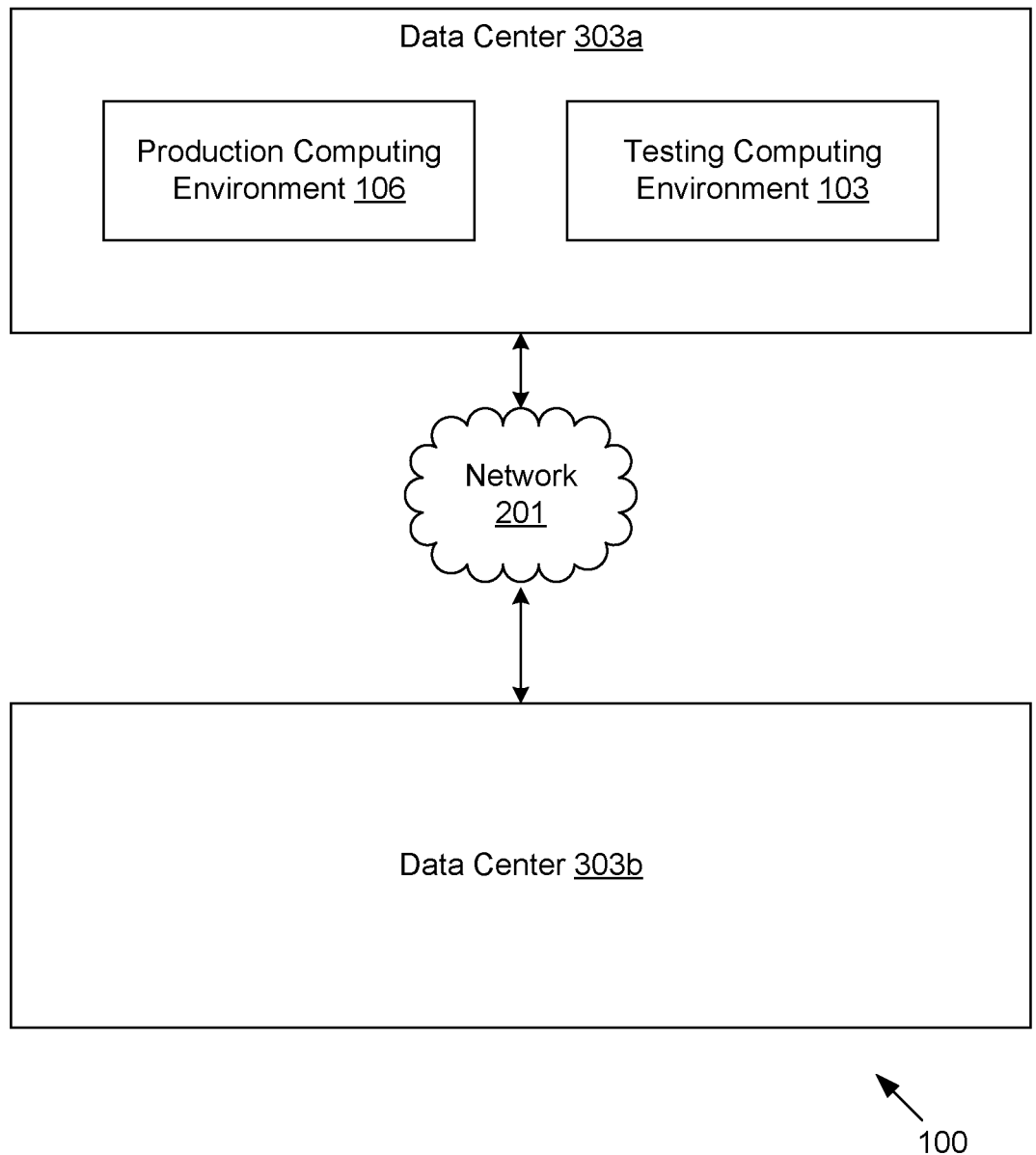
FIG. 3 is a schematic block diagram of an alternative view of the networked environment of FIG. 2 according to various embodiments of the present disclosure.

Referring next to FIG. 3, shown is an alternative view of the networked environment 100 according to various embodiments. The networked environment 100 can be formed as a number of regions, where a region is a geographical area in which a provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the networked environment 100 via a publicly accessible network (e.g., the Internet, a cellular communication network). Transit Centers (TC) are the primary backbone locations linking customers to the networked environment 100, and may be co-located at other network provider facilities (e.g., Internet service providers, telecommunications providers). Each region can operate two TCs for redundancy.

Specifically, the networked environment 100 may include a plurality of data centers 303, which in some scenarios may be in different geographic regions. In other scenarios, the data centers 303 may be in the same building but correspond to different availability zones such that they may have independent power sources, independent network connectivity, and/or other characteristics that allow the data centers 303 to function independently or otherwise provide independent availability characteristics.

As shown, the data center 303a may include the production computing environment 106 and the testing computing environment 103. Multiple data centers 303 may include the same, or near replicas of, the production computing environment 106, with a same or similar suite of services 203 (FIG. 2). The testing computing environment 103 may be provisioned within the same data center 303 as a production computing environment 106, but the testing computing environment 103 may be on a different virtualized network that isolates the testing computing environment 103 from the production computing environment 106. For example, the testing computing environment 103 may be configured for deployment to a different geographic area or region, and communications between the testing computing environment 103 and the production computing environment 106 may exit the virtual network and appear as external traffic to the other computing environment.

In various scenarios, the testing computing environment 103 may be configured in the data center 303a only for initial deployment of services and testing purposes. Once the testing computing environment 103 is fully configured and all the services 212 (FIG. 2) are online, the testing computing environment 103 may be migrated from the data center 303a to the data center 303b. For example, the migration may involve transferring data images of virtual machine instances from physical computing devices in the data center 303a to physical computing devices in the data center 303b. The data center 303b may correspond to a new or rebuilt data center 303, and it may be desired to set up the testing computing environment 103 such that it is immediately ready to be deployed to the data center 303b once the data center 303b becomes operational.

Figure 4:
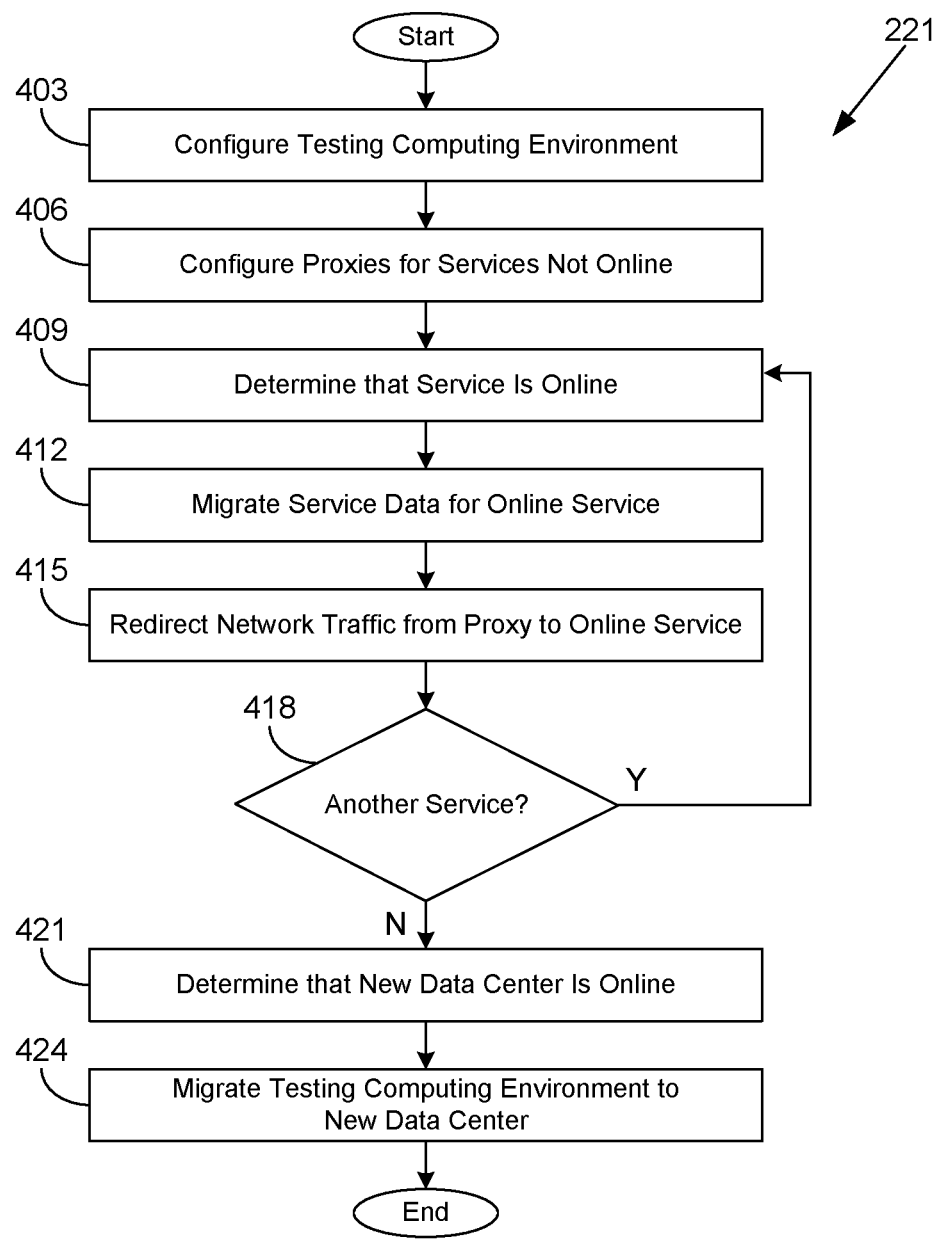
FIG. 4 is a flowchart illustrating one example of functionality implemented as portions of migration management service executed in a computing environment in the networked environment of FIG. 2 according to various embodiments of the present disclosure.

Turning now to FIG. 4, shown is a flowchart that provides one example of the operation of a portion of the migration management service 221 according to various embodiments. It is understood that the flowchart of FIG. 4 provides merely an example of the many different types of functional arrangements that may be employed to implement the operation of the portion of the migration management service 221 as described herein. As an alternative, the flowchart of FIG. 4 may be viewed as depicting an example of elements of a method implemented in the testing computing environment 103 (FIG. 2) according to one or more embodiments.

Beginning with box 403, the migration management service 221 configures a testing computing environment 103 (FIG. 2) in the networked environment 100 (FIG. 2). In this regard, the migration management service 221 may configure a virtual private network within a data center 303 (FIG. 3) and then instantiate various virtual machine instances on the virtual network. The testing computing environment 103 may be intended to be a replica or near replica of an existing production computing environment 106 (FIG. 2) for deployment in a new data center 303 which may be in a different geographic region.

In box 406, the migration management service 221 may configure proxies 121 (FIG. 2) for services 212 (FIG. 2) that are not yet online in the testing computing environment 103 or are predicted to have a delayed deployment. The services 212 may be ones upon which other services 212 depend. In this regard, the migration management service 221 may perform an analysis on past deployments of testing computing environments 103 to determine which services 212 were delayed and whether other services 212 were depending on such delayed services 212. The migration management service 221 may also perform an analysis to predict the demand associated with such services 212. The demand may be used to instantiate a number of proxies 121 to handle service calls for such services 212 to scale with the demand. Alternatively, the migration management service 221 may automatically scale the instances of the proxies 121 based at least in part on observed demand.

In some cases, the proxies 121 may have interfaces specific to an application programming interface (API) of the proxied service. For example, the proxies 121 may have stub methods corresponding to methods in the specific API. Alternatively, the proxies 121 may have a generic interface that may function for any API or APIs whose methods are not known in advance. With a generic interface, a single code base for the proxy 121 may function for many different services 212 with many different APIs. However, specific instances of the proxy 121 may be created for specific services 212 to handle demand.

In configuring the proxies 121, the migration management service 221 may deploy load balancers 213 (FIG. 2) to route service calls to specific instances of proxies 121. The migration management service 221 may configure hostnames, network addresses, domain names, instance names, unique identifiers, and so forth, within the testing computing environment 103 so that service calls for a particular service 212 that is unavailable are routed to particular proxies 121 rather than to return an error that the particular service 212 is unavailable. As such, the configured proxies 121 masquerade as the particular services 212.

In addition, the migration management service 221 may configure the proxies 121 to route service calls for the particular service 212 to a corresponding instance of the same service 203 (FIG. 2) within a production computing environment 106, which may be on a different virtual private network, in a different data center 303, and/or in a different geographic region. The migration management service 221 may configure the proxies 121 to perform some form of translation on the service calls and/or service responses. Through the operation of the proxy 121, the migration management service 221 allows the services 212 of the testing computing environment 103 to be fully tested even when all services 212 are not yet online.

In box 409, the migration management service 221 determines that a service 212 that had been proxied is now online. For example, an administrator of the service 212 may send a notification that the service 212 is ready or modify a flag in a dashboard of the migration management service 221. Alternatively, the migration management service 221 may automatically detect that the service 212 is executing in the testing computing environment 103. In box 412, the migration management service 221 migrates service data 209 (FIG. 2) for the service 212 from the data store 206 (FIG. 2) to the service data 218 (FIG. 2) in the data store 207 (FIG. 2). For example, in response to service calls requesting that data be stored, the service 203 may have stored the data in the data store 206, and that data may need to be migrated to the data store 207.

In box 415, the migration management service 221 redirects network traffic (e.g., service calls) from the proxy 121 to the newly online service 212. For example, the migration management service 221 may reconfigure hostnames, domain names, etc., to point to the newly online service instead of the proxy 121. Alternatively, the migration management service 221 may reconfigure the load balancer 213 to redirect the network traffic to the service 212 instead of the proxy 121. It is noted that the order of box 412 and box 415 may be reversed in other examples, such that migration of the service data 209 follows after the redirection of the network traffic.

In box 418, the migration management service 221 determines whether another service 212 is still being proxied. If so, the migration management service 221 returns to box 409 and waits until the next service 212 is ready to come online. Otherwise, the migration management service 221 continues to box 421.

In box 421, the migration management service 221 determines that a new data center 303 has come online. In other words, the hardware and virtualization infrastructure are available for use. In box 424, the migration management service 221 migrates the testing computing environment 103 to the new data center 303. For example, the migration management service 221 may take an image of the various virtual machine instances in the testing computing environment 103 and transfer those images to the new data center 303 so that the corresponding virtual machine instances can be launched in the new data center 303. Thereafter, the operation of the portion of the migration management service 221 ends.

Figure 5:
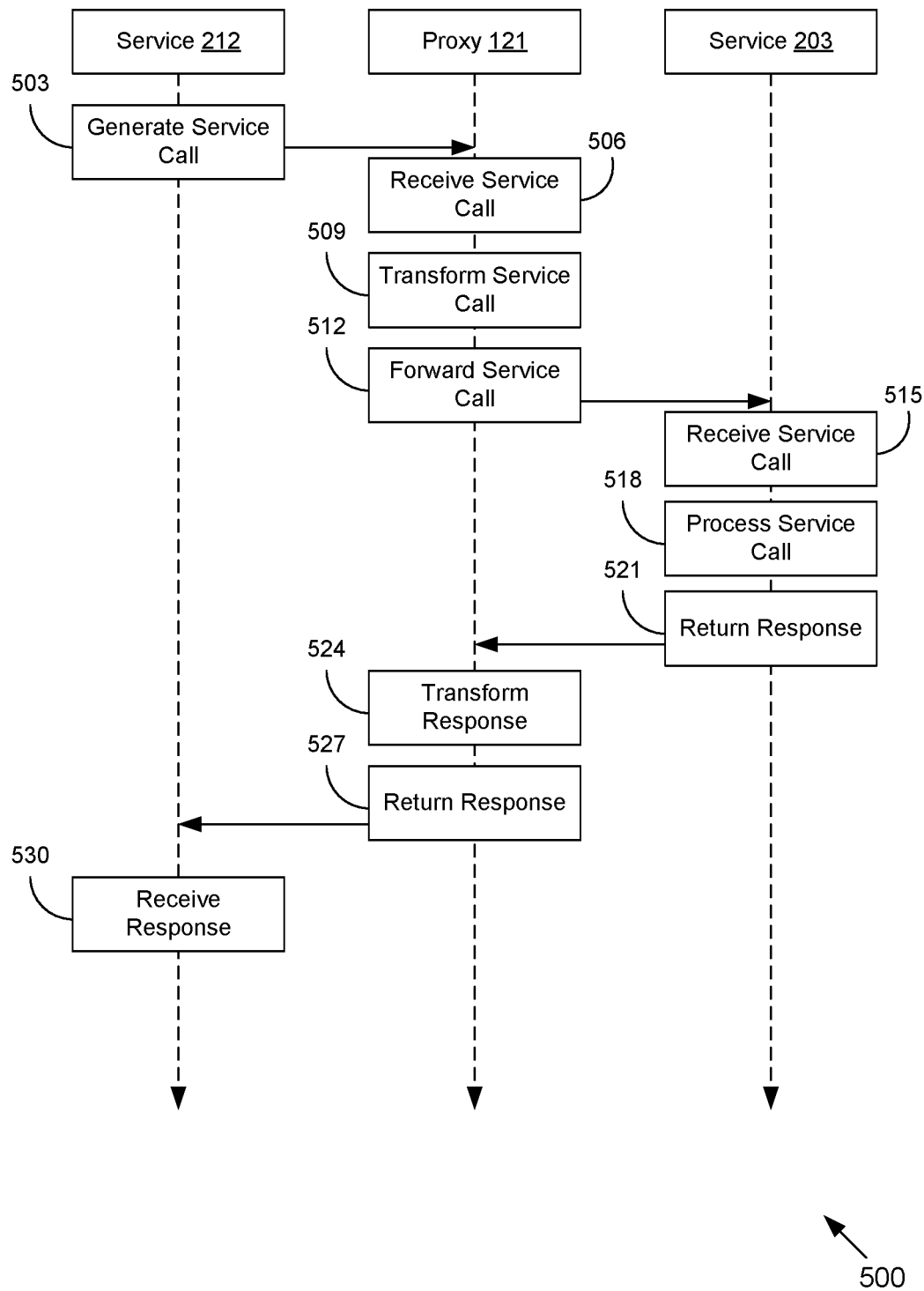
FIG. 5 is a sequence diagram illustrating one example of the interaction between a service, a proxy, and another service executed in computing environments in the networked environment of FIG. 2 according to various embodiments of the present disclosure.

Continuing to FIG. 5, shown is a sequence diagram 500 that provides one example of the interaction between portions of a service 212, a proxy 121, and a service 203 according to various embodiments. It is understood that the sequence diagram 500 provides merely an example of the many different types of functional arrangements that may be employed to implement the operation of the portions of the service 212, the proxy 121, and the service 203 as described herein. As an alternative, the sequence diagram 500 may be viewed as depicting an example of elements of a method implemented in the networked environment 100 (FIG. 2) according to one or more embodiments.

Beginning with box 503, a service 212 in the testing computing environment 103 (FIG. 2) generates a service call to another service 212 in the testing computing environment 103. For example, the service call may be to store some data, add a message to a queue, manage a workflow, or perform other types of actions. However, the other service 212 is not yet online in the testing computing environment 103, and the proxy 121 masquerades as the other service 212.

As such, in box 506, the proxy 121 receives the service call, potentially by way of a load balancer 213 (FIG. 2). The instance of the proxy 121 may receive service calls on behalf of multiple different services 212 that are not yet online in the testing computing environment 103. In box 509, the proxy 121 may transform the received service call. The proxy 121 may alter various headers or content of the service call. For example, the proxy 121 may alter the source or destination of the service call. The proxy 121 may also record state data in a memory regarding the service call in order to reverse the transformation, correlate a response with the service all, or perform other functions. In box 512, the proxy 121 forwards the service call to an instance of a service 203 in the production computing environment 106 (FIG. 2). This service 203 may be the same as the service 212 that is not yet online in the testing computing environment 103.

In box 515, the service 203 receives the service call. In box 518, the service 203 processes the service call. This processing may result in creation of state data or other data in the service data 209 (FIG. 2) in the data store 206 (FIG. 2) of the production computing environment 106. In box 521, the service 203 returns a response to the service call to the proxy 121 in the testing computing environment 103.

In box 524, the proxy 121 may transform the response. The proxy 121 may alter various headers or content of the response, with the goal to make the forwarding transparent to the service 212. For example, the proxy 121 may alter the source or destination of the service call. In box 527, the proxy 121 returns the response to the calling service 212 in the testing computing environment 103. In box 530, the service 212 receives the response, with the service 212 not being aware that the other service 212 is not yet online in the testing computing environment.

Figure 6:
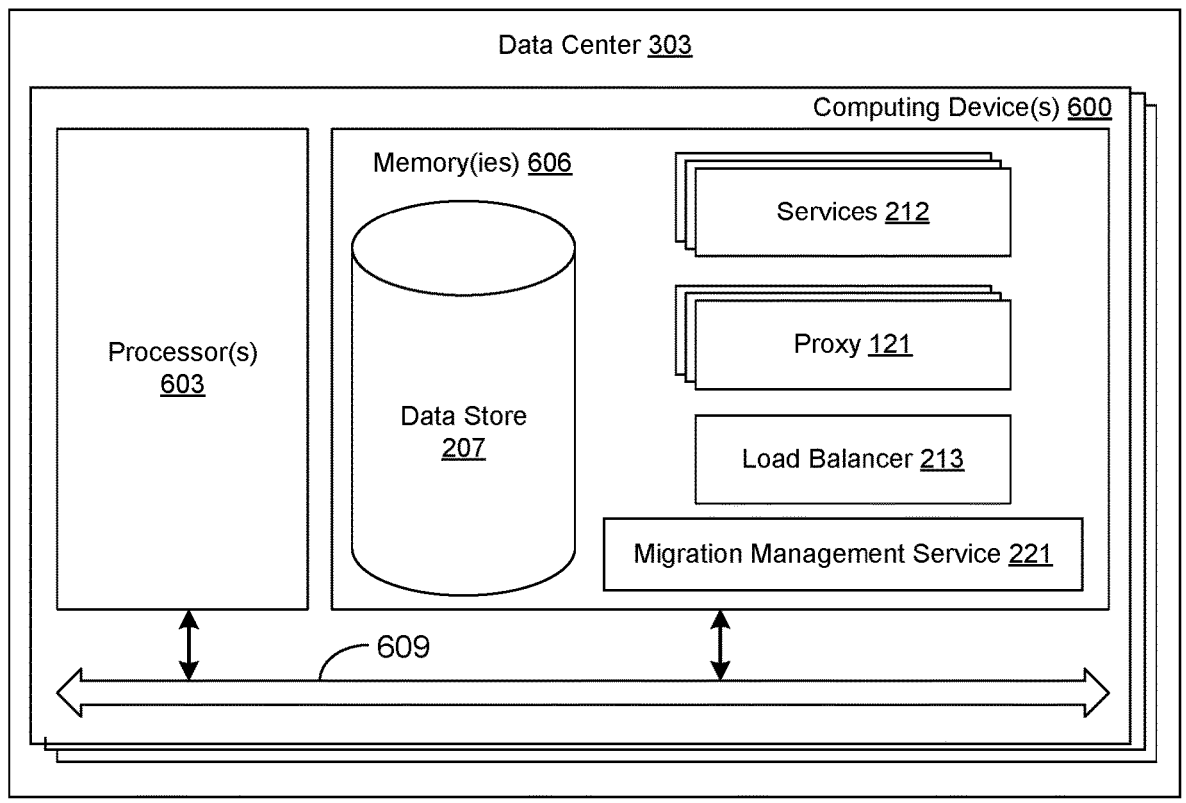
FIG. 6 is a schematic block diagram that provides one example illustration of a data center employed in the networked environment of FIG. 2 according to various embodiments of the present disclosure.

With reference to FIG. 6, shown is a schematic block diagram of a data center 303 according to an embodiment of the present disclosure. The data center 303 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the services 212, the proxy 121, the load balancer 213, the migration management service 221, and potentially other applications. Also stored in the memory 606 may be a data store 207 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the services 212, the proxy 121, the load balancer 213, the migration management service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 and the sequence diagram of FIG. 5 show the functionality and operation of an implementation of portions of the services 212, the proxy 121, the load balancer 213, the migration management service 221, and the services 203. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 4 and the sequence diagram of FIG. 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the services 203, the services 212, the proxy 121, the load balancer 213, and the migration management service 221, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the services 203, the services 212, the proxy 121, the load balancer 213, and the migration management service 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in one or more data centers 303.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device for adding a new geographic region to a cloud provider network, wherein when executed the program causes the at least one computing device to at least:

configure a testing computing environment in the at least one computing device in which a plurality of services for the new geographic region are configured for testing in advance of the new geographic region going online in the cloud provider network, the plurality of services including a plurality of first services and a plurality of second services;

configure a proxy in the testing computing environment to receive and transform service calls for individual services of the plurality of first services from any of the plurality of second services in the testing computing environment and to forward the service calls to corresponding instances of the plurality of first services in a production computing environment that is outside of the testing computing environment in at least one existing geographic region differing from the new geographic region, the plurality of first services being unexecuted in the testing computing environment, wherein the proxy is configured to maintain state data for one or more of the service calls, an operation of at least one second service of the plurality of second services being dependent on an availability of at least one first service of the plurality of first services;

test the plurality of second services in the testing computing environment that generate the service calls for the plurality of first services, wherein the service calls are handled by the proxy during testing;

execute corresponding instances of the plurality of first services in the testing computing environment subsequently to the proxy being configured;

migrate data associated with the service calls from the corresponding instances of the plurality of first services in the production computing environment to the corresponding instances of the plurality of first services in the testing computing environment; and redirect subsequent service calls by the plurality of second services from the proxy to the corresponding instances of the plurality of first services in the testing computing environment.

2. The non-transitory computer-readable medium of claim 1, wherein when executed the program further causes the at least one computing device to at least migrate the testing computing environment to a different data center.

3. A method, comprising:

executing a proxy for a first service in a testing computing environment, the testing computing environment comprising one or more first data centers in a new geographic region being added to a cloud provider network, the first service being configured for testing in the testing computing environment in advance of the new geographic region going online in the cloud provider network, the first service being unexecuted in the testing computing environment;

receiving, by the proxy, a respective service call from individual second services of a plurality of second services in the testing computing environment, the respective service calls being received via an interface that is generic to the respective service calls, an operation of the individual second services being dependent on an availability of the first service;

forwarding, by the proxy, the respective service calls to an instance of the first service in a production computing environment, the production computing environment comprising one or more second data centers in at least one existing geographic region differing from the new geographic region;

receiving, by the proxy, corresponding responses to the respective service calls from the instance of the first service; and returning, by the proxy, the corresponding responses to the respective service calls to the individual second services of the plurality of second services.

4. The method of claim 3, further comprising:

determining that an instance of the first service has been configured in the testing computing environment subsequently to the proxy being executed; and redirecting a subsequent service call from at least one of the plurality of second services to the instance of the first service in the testing computing environment instead of the proxy.

5. The method of claim 4, further comprising terminating the proxy in the testing computing environment in response to determining that the instance of the first service has been configured in the testing computing environment.

6. The method of claim 4, further comprising migrating data associated with the respective service calls from the instance of the first service in the production computing environment to the instance of the first service in the testing computing environment.

7. The method of claim 4, further comprising migrating the instance of the first service in the testing computing environment and the at least one of the plurality of second services from the testing computing environment to another production computing environment.

8. The method of claim 3, further comprising storing, by the proxy, state information for the respective service calls in a memory.

9. The method of claim 3, wherein a plurality of instances of the proxy are executed in the testing computing environment, and a load balancer is configured to route the respective service calls to one of the plurality of instances of the proxy.

10. The method of claim 3, wherein forwarding the respective service calls further comprises performing a transformation on a header of the respective service calls.

11. A system, comprising:

at least one computing device; and instructions executable in the at least one computing device, wherein when executed the instructions cause the at least one computing device to at least:

configure a proxy in a testing computing environment in a new geographic region to receive and transform service calls for a plurality of first services in the testing computing environment and to forward the service calls to at least one corresponding instance of the plurality of first services not in the testing computing environment and in at least one existing geographic region differing from the new geographic region, the new geographic region being added to a cloud provider network, the plurality of first services being configured for testing in the testing computing environment in advance of the testing computing environment going online in the cloud provider network, the plurality of first services being unexecuted in the testing computing environment; and test a plurality of second services in the testing computing environment that generate the service calls for the plurality of first services, wherein the service calls are handled by the proxy during testing, an operation of at least one second service of the plurality of second services being dependent on an availability of at least one first service of the plurality of first services.

12. The system of claim 11, wherein the testing computing environment is a virtualized networked environment comprising a plurality of virtual machine instances.

13. The system of claim 11, wherein a plurality of instances of the proxy are behind a load balancer in the testing computing environment.

14. The system of claim 11, wherein when executed the instructions cause the at least one computing device to at least:

deploy at least one corresponding instance of the plurality of first services in the testing computing environment; and redirect network traffic from the proxy to the at least one corresponding instance of the plurality of first services in the testing computing environment.

15. The system of claim 14, wherein when executed the instructions cause the at least one computing device to at least migrate data associated with the service calls from the at least one corresponding instance of the plurality of first services not in the testing computing environment to the at least one corresponding instance of the plurality of first services in the testing computing environment.

16. The system of claim 14, wherein redirecting the network traffic further comprises reconfiguring a load balancer to direct the network traffic to the at least one corresponding instance of the plurality of first services in the testing computing environment instead of the proxy.

17. The system of claim 11, wherein when executed the instructions cause the at least one computing device to at least migrate the testing computing environment to a different data center.

18. The system of claim 11, wherein the proxy supports a generic interface to receive the service calls that are specific to respective interfaces of the plurality of first services.

19. The non-transitory computer-readable medium of claim 1, wherein testing the plurality of second services in the testing computing environment depends on an availability of the plurality of first services in the testing computing environment via the proxy.

20. The non-transitory computer-readable medium of claim 1, wherein the testing computing environment is created in one or more of the at least one existing geographic region and then migrated to the new geographic region.

* * * * *